United States Patent [19]

Borek

[11] 4,219,573
[45] Aug. 26, 1980

[54] MICROWAVE POPCORN PACKAGE

[75] Inventor: James R. Borek, Burnsville, Minn.

[73] Assignee: The Pillsbury Company, Minneapolis, Minn.

[21] Appl. No.: 15,036

[22] Filed: Feb. 26, 1979

[51] Int. Cl.² .............................................. B65D 81/34
[52] U.S. Cl. .............................. 426/107; 219/10.55 E;
426/111; 426/113; 426/234
[58] Field of Search ............... 426/107, 113, 234, 243,
426/111; 220/441, 443; 219/10.55 E, 10.55 M;
126/390

[56] References Cited

U.S. PATENT DOCUMENTS

| 1,856,920 | 5/1932 | Lohner et al. | 220/441 |
| 1,974,186 | 9/1934 | Kollman | 126/390 |
| 2,071,303 | 2/1937 | Hill | 220/441 |
| 3,144,979 | 8/1964 | Young | 229/DIG. 3 |
| 3,230,864 | 1/1966 | Krajewski | 219/10.55 E |
| 3,353,968 | 11/1967 | Krajewski | 126/390 |
| 3,777,094 | 12/1973 | Peters | 126/390 |
| 3,835,280 | 9/1974 | Gades et al. | 219/10.55 E |
| 3,940,052 | 2/1976 | McHugh | 220/404 |
| 3,941,967 | 3/1976 | Sumi et al. | 219/10.55 E |
| 3,973,045 | 8/1976 | Brandberg et al. | 229/DIG. 3 |
| 3,985,990 | 10/1976 | Levinson | 219/10.55 E |
| 3,985,991 | 10/1976 | Levinson | 219/10.55 E |
| 4,038,425 | 7/1977 | Brandberg et al. | 229/DIG. 3 |
| 4,140,887 | 2/1979 | Sutton | 219/10.55 E |
| 4,156,806 | 5/1979 | Teich et al. | 219/10.55 E |

*Primary Examiner*—Steven L. Weinstein
*Attorney, Agent, or Firm*—Robert J. Lewis; Michael D. Ellwein; Mart C. Matthews

[57] ABSTRACT

A package for popping popcorn in a microwave oven is provided. The package includes an expandable container adapted to contain popcorn, oil and salt which when exposed to microwave radiation, the oil and popcorn will become heated and the popcorn will pop (steam produced by the heating will expand the container to accommodate the popped popcorn). The container has one wall with a thermal insulating pad associated therewith which improves the popping performance of the popcorn by preventing heat loss from the package to the oven floor.

9 Claims, 7 Drawing Figures

OVEN FLOOR TEMPERATURE DISTRIBUTION IMMEDIATELY AFTER POPPING. BAG DIRECTLY ON OVEN FLOOR.

OVEN FLOOR TEMPERATURE DISTRIBUTION IMMEDIATELY AFTER POPPING. BAG ON A PAD.

MICROWAVE POPCORN PACKAGE

FIELD OF THE INVENTION

The present invention relates to an improved microwave popcorn package adapted for storing popcorn, oil and salt which will be subsequently exposed in the package to microwave radiation to effect popping of the popcorn.

BACKGROUND

The use of microwave ovens in the home has become increasingly popular in recent years because of its speed, economy, etc. Typically, home ovens have a power operating capacity of from about 400 watts to about 1000 watts, while institutional ovens have an operating capacity of from about 750 watts to about 2200 watts.

The popping of popcorn in a microwave oven has presented problems, typical of which is the low percentage of popcorn popped. Some of these problems were overcome by the invention disclosed in U.S. Pat. No. 3,973,045 to Brandberg et al. The package of the subject patent works very effectively and provides reasonably good popping results and overcame some problems attendant with popping popcorn in a microwave oven.

Another problem with popping popcorn in a microwave oven is that the oven, to achieve adequate popping, had to be a higher powered oven. It would be desirable to be able to achieve adequate popping in the lower powered ovens, i.e., for example, a 600 or 700 watt oven as opposed to 1000 watt oven.

It is well known that in the oven chamber of a microwave oven that there is a wide disparity of field strength—this is commonly referred to as hot spots and cold spots in the oven. What this ultimately results in is that one area of an oven will cook differently than another area of the same oven. Further, even with the same model oven, the hot and cold spot positions will vary between individual ovens. When initial work was done to improve popping performance of the popcorn, it was felt that the position of the popcorn within the oven was the parameter which caused either good popping performance or bad popping performance. One solution to this problem is disclosed in U.S. Pat. No. 3,835,280 to L. D. Gades, et al. Even though the structure disclosed therein was effective for improving popping performance, it was a relatively expensive solution to the problem.

Much effort has been devoted to improving the popping performance of popcorn in an oven, and these efforts have been directed primarily to changing the field in an oven cavity to eliminate cold spots. The problem was never considered to be a heat-loss problem since ovens used had adequate capacity for providing sufficient heat to achieve popping of the popcorn. Recent experimental work has unexpectedly indicated that the problem is not necessarily not and cold spots in the oven, but heat loss from the popcorn. The reason for not expecting heat loss to be the problem was that the floors of ovens were considered to be good thermal insulators. Test results indicate that this is not the case when popping of popcorn is to be achieved.

Thus, by providing a package for both the storage and popping of popcorn which would prevent heat loss to the floor of the oven, improved popping performance can be achieved. In fact, very unexpectedly, not only did the percent of popped kernels improve by use of the present invention, but also the volumetric expansion of each of the popped kernels improved providing a lighter, less dense popped popcorn.

Experimental data indicates that a decrease of 16% in the unpopped kernels can be achieved while an increase of about 17% in volumetric expansion can be achieved by use of the present invention.

OBJECTS OF THE INVENTION

An object of the present invention is to provide an improved package for storing popcorn, oil and salt and popping of the popcorn in a microwave oven. Another object of the present invention is to provide a package for popping popcorn which is expandable during popping and reduces heat loss from the package. A still further object of the present invention is to provide an improved package which will increase the percentage of popcorn popped and also improve the volumetric expansion of the popcorn during popping.

THE FIGURES

DESCRIPTION OF THE INVENTION

Figure 1:
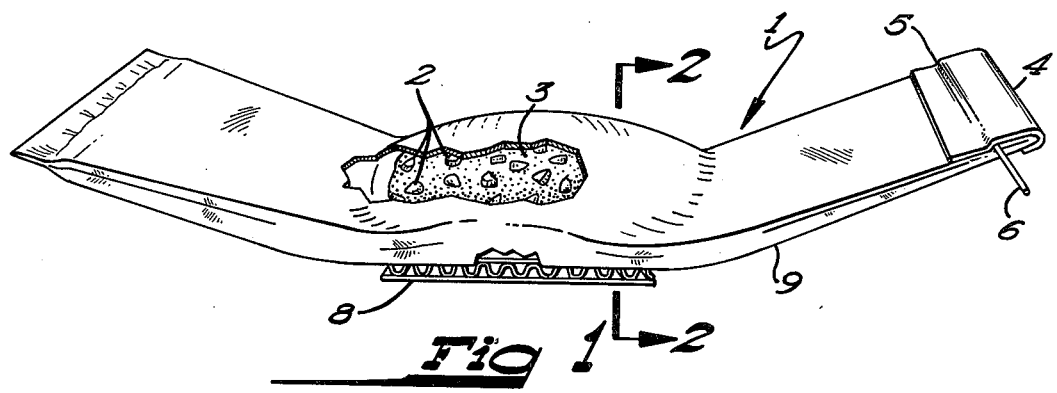
FIG. 1 is a perspective view of a package embodying the present invention.

The present invention includes a package or container 1 which is preferably expandable to provide volume for the popped kernels 2 of popcorn. The package can be any suitable type adapted for use in microwave radiation environments, such as the package disclosed in U.S. Pat. No. 3,973,045 which disclosure is incorporated herein by reference. A package such as that disclosed in the subject patent is a presently preferred embodiment of the present invention. The kernels of corn are admixed with salt and oil 3 with the mass of oil, salt and popcorn being in a plastic state and located in one area of the package 1 as, for example, in the center as seen in FIG. 1. Such an arrangement allows the opposite ends of the package 1 to be folded over on top of the center portion for shipping and storage and for display in a supermarket or the like.

The package 1 is sealed from the atmosphere in any suitable manner and preferably has one easy-opening end 4. Any suitable type of easy-opening device can be utilized. As shown, a tape 5 holds an end portion in folded-over relationship to the remainder of the bag and a string 6 is positioned between the tape and the bag and provides a tear means for severing the tape allowing opening of the end 4 of the package 1.

The package 1 can be of any suitable type of material such as kraft paper with an oil barrier to prevent the leakage of oil from the package. Also, the package 1 should be of a material which is suitable for use in a microwave oven and preferably would be non-lossy and microwave transparent.

Figures 2, 3:
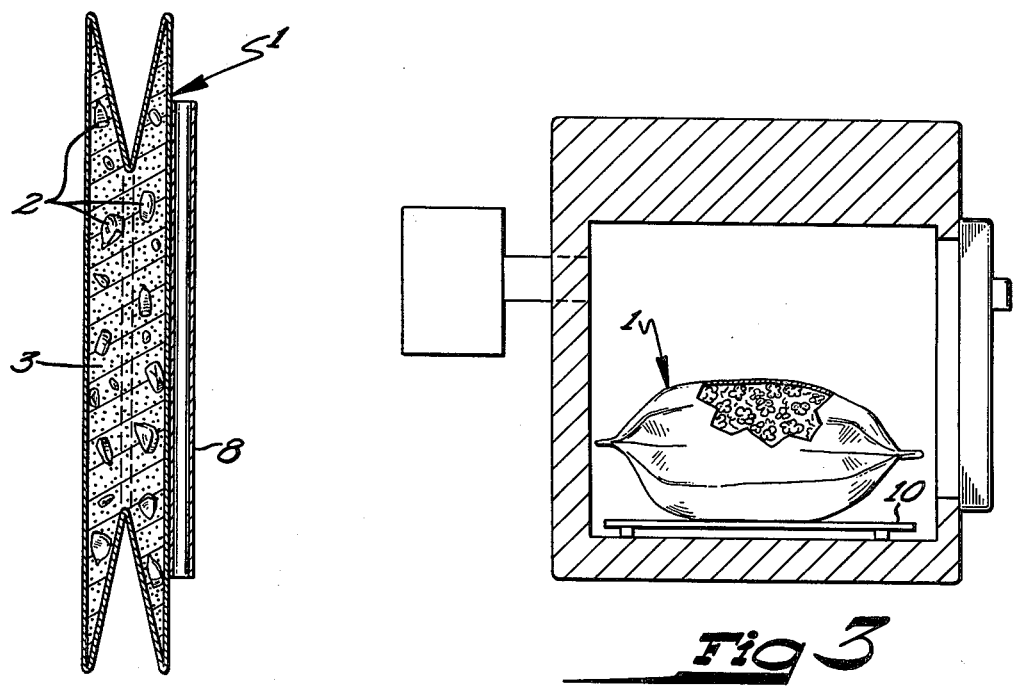
FIG. 2 is a sectional view of the package taken along line 2—2, FIG. 1.
FIG. 3 is a figure illustrating the package in its expanded state in a microwave oven.
Figure 4:
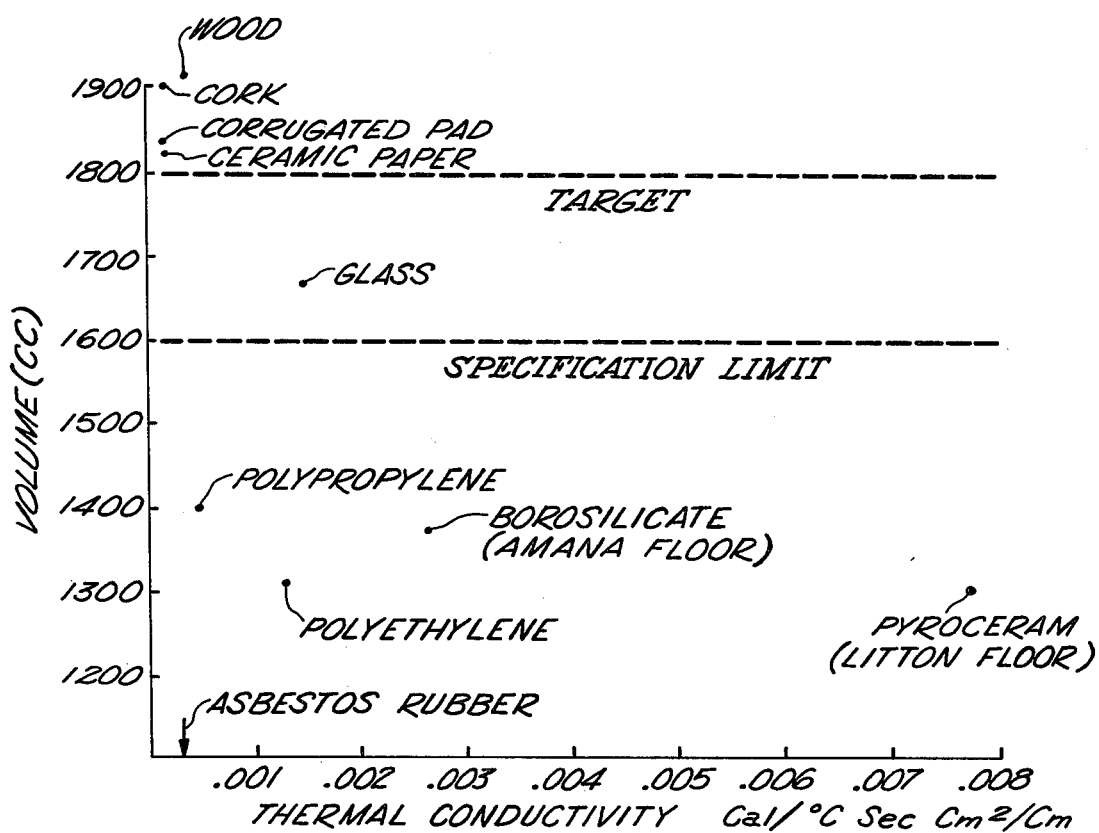
FIG. 4 is a graph illustrating certain performance characteristics of various materials underlying the popcorn package during popping.
Figure 5:
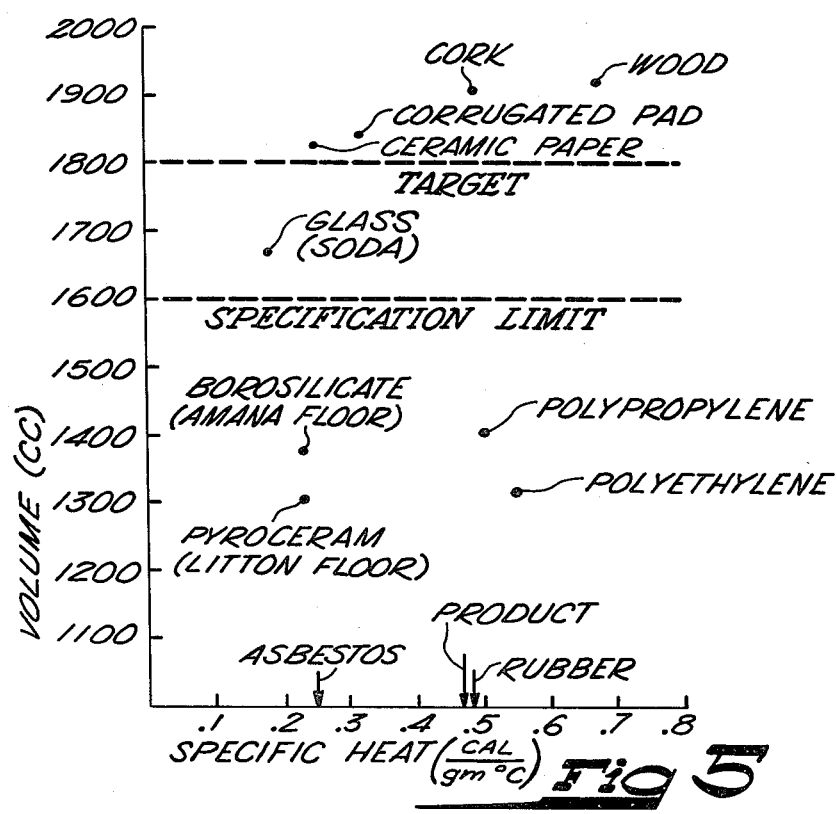
FIG. 5 is a graph illustrating performance characteristics of various materials used as insulating mediums under a popcorn package during popping.

The weight of the popcorn contained in the package can vary; however, it is presently preferred that the charge of popcorn be within the range of about 60 grams to about 100 grams wherein the package 1 should be expandable to accommodate the popped volume of the corn which will be approximately 1400 cc to 2400 cc. The package 1 will expand when steam is produced by heating the popcorn and the bag will assume a shape similar to that illustrated in FIG. 3.

The package 1 includes an insulating member 8 associated with one wall 9 of the package 1 and is in the proximity of the mass of corn, oil and salt. The material 8 is positioned relative to the popcorn and oil to retard heat loss to the floor of the oven and preferably is positioned to be between the popcorn and oil and the oven floor when the package 1 is resting on the oven floor 10. The insulating member 8 can be secured to the exterior of the wall 9, interposed between two layers of a wall 9 or can be positioned on the inside of the package. If positioned inside the package, the member 8 is preferably secured to the interior surface of the wall 9. The manner of attachment of the member 8 to the wall 9 is not critical to the present invention; however, it is preferred that the insulating member 8 be secured in a permanent fashion to the wall 9 as, for example, by gluing or otherwise bonding the member 8 to the wall 9. The exposed surface of the member 8 can have indicia printed thereon for advertising, operating instructions or the like.

In operation it is preferred that the mass of corn, oil and salt be positioned directly on top of the insulating member 8 so as to retard heat transfer to the oven floor 10. It is to be understood that other material can be interposed between the member 8 and the mass of corn, oil and salt, such as the wall of the package 1. If the mass of corn, oil and salt do not rest on the member 8, then the thermal insulating properties of the member 8 will be of no benefit. It is to be noted that the package 1 can be provided with means for retaining the mass of corn, oil and salt in a fixed relationship to the member 8. Further, the package 1 can be designed similar to the package illustrated in FIG. 1 whereby the mass of corn, oil and salt is retained in position relative to the member 8 by folding the opposite ends of the package 1, preventing movement of the corn, oil and salt out of position.

The member 8 can be of any suitable material and is preferably corrugated paper. It is preferred that the member 8 have thermal insulating properties such that at least about 18 calories per gram of popcorn in the package which would normally have been lost without the insulating member be retained in the package. Preferably, at least about 21 calories per gram will be retained, more preferably at least about 24 calories per gram and most preferably at least about 27 calories per gram will be retained in the package due to the thermal insulating properties of the member 8. Another manner of expressing the thermal insulating properties of the member 8 is that it have sufficient thermal insulating properties that at least about 12 calories per sq. cm. of member 8 contacting the floor 10 will be retained that would have been lost if the member 8 were not present. Preferably, at least about 14 calories per sq. cm., more preferably at least about 16 calories per sq. cm., and most preferably at least about 18 calories per sq. cm. will be retained in the package.

The insulating member 8 can also be defined by its coefficient of thermal conductivity, density and thickness. In defining the insulating member 8 in this manner, the coefficient of thermal conductivity is preferably less than about 0.001 calories/sq. cm. °C./cm., more preferably this value is less than about 0.0005 and most preferably less than about 0.00025. The density of the member 8 is preferably less than about 0.40 gm/cm$^3$, more preferably less than about 0.2 gm/cm$^3$ and most preferably less than about 0.1 gm/cm$^3$. The thickness of the member 8 should be kept at a minimum to keep the package 1 as close to the floor 10 as possible. Preferably, the thickness is less than about $\frac{3}{8}$", more preferably less than about $\frac{2}{8}$" and most preferably less than about $\frac{1}{8}$".

The present invention was tested using a bag similar to that shown in FIG. 1 and an insulating member 8 which had a specific heat of 0.32 calories/gram °C., thermal conductivity value of 0.000121 calories/cm$^2$ °C./cm, density of 0.071 gm/cm$^3$ and was 0.23 cm thick and was 8.5 cm by 11.5 cm in width and length. Using the insulating member 8, a volumetric expansion of the popcorn of 35 cc per gram of popped popcorn was achieved and an 80% popping efficiency was achieved, i.e., 80% of the kernels were popped. Without the use of the member 8, that is just laying the package 1 on the oven floor, a volumetric expansion of 30 cc per gram of popcorn popped was achieved while the popping efficiency was 76%. Such an improvement was totally unexpected since the normal floor of an oven is considered to be a good thermal insulator.

Figure 6:
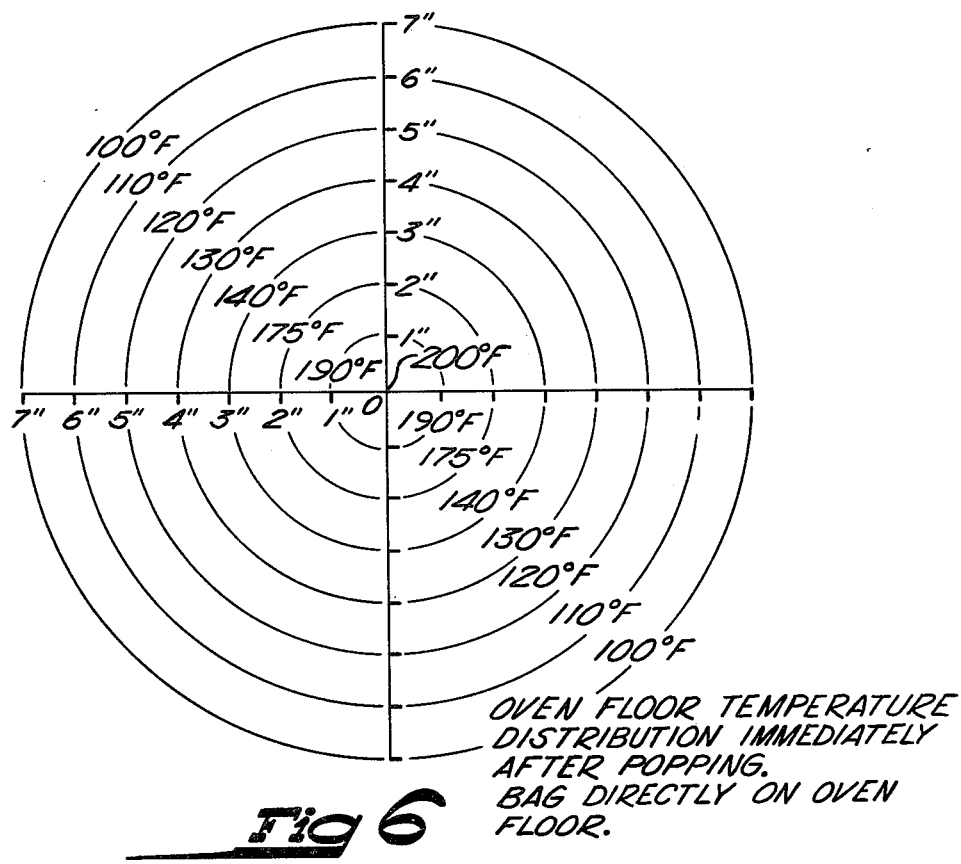
FIG. 6 is a graph illustrating the temperature profile on the oven floor immediately after popping with the container being uninsulated.
Figure 7:
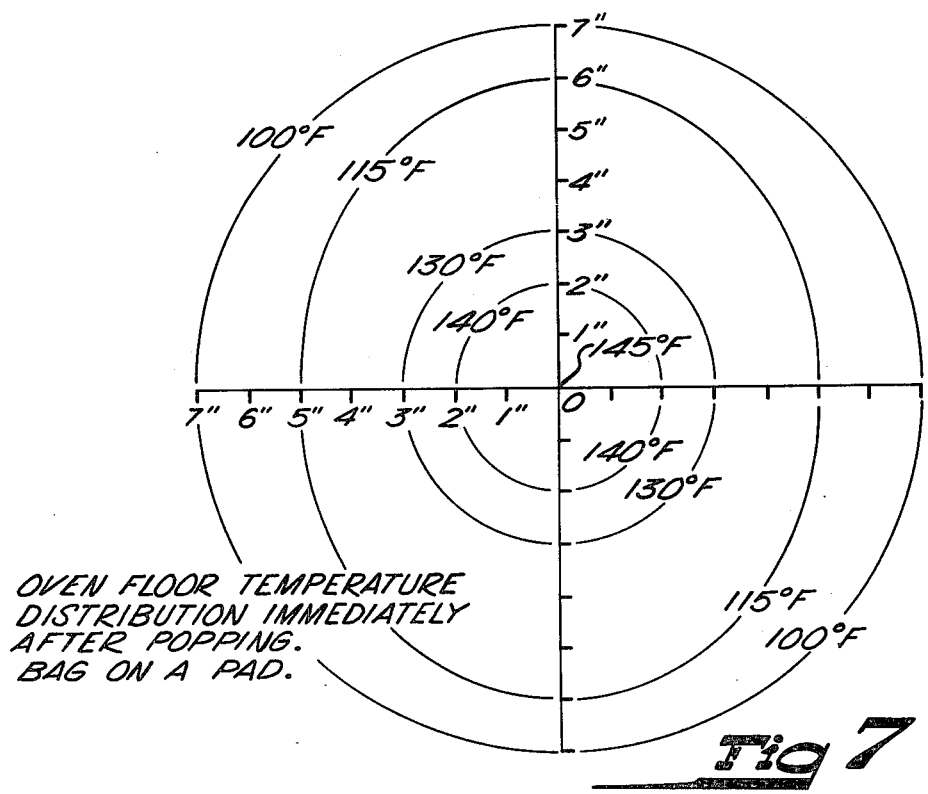
FIG. 7 is a graph illustrating temperature profile on an oven floor when a popcorn package is the improved package of the present invention.

As can be seen in FIGS. 6 and 7, the temperature of the oven floor is greatly reduced by the use of the insulator 8. With the insulator, the maximum floor temperature at the center of the package was about 145° F. as seen in FIG. 7 while without the insulator, the maximum floor temperature was about 200° F., illustrating the reduced heat loss to the oven floor. Temperature measurement of the popping oil has indicated that without the insulating pad, the maximum oil temperature which could be achieved was about 335° F., while with the pad the oil temperature achieved was about 398° F.

Tests have indicated that by use of the insulating pad 8 in combination with the package containing 66.5 grams of popcorn, 29.5 grams of oil and heating in a Litton 460 (650 watts) oven for 3.75 minutes both increased volumetric expansion and popping efficiency were achieved. The only difference between the two sets of tests was the use of an insulating pad of corrugated paper. By use of the pad, an average volume increase of 255 cc was achieved with a standard error of 32 cc, i.e., with the pad 1834 cc popped popcorn volume was achieved with the pad while with an uninsulated package, 1579 cc of popped popcorn was achieved. Also, the percent of kernels popped increased from 76% with an uninsulated bag to 80% with the insulated bag. Such increase in performance occurred in 75% of the microwave ovens used, with the microwave ovens being representative of 16 brands and 42 models having a power output of 550 watts to 750 watts.

By use of the present invention, adequate popping can be achieved in smaller wattage ovens, for example, 650 watt which before required the higher wattage ovens as, for example, the 1000 watt ovens which are more expensive than and not as common as the smaller output ovens. Thus, the advantage of the present invention is readily apparant in that excellent popping results can be achieved in the smaller ovens and even greater improved popping efficiency can be achieved in the higher wattage ovens.

It is to be understood that while there has been illustrated and described certain forms of the present invention, it is not to be limited to the specific form or arrangement of parts herein described and shown, except to the extent that such limitations are found in the claims.

What is claimed and desired to be secured by Letters Patent is:

1. An improved expandable popcorn container for use in microwave ovens with the containers being adapted to store popcorn, oil and salt before popping and being adapted to contain the popcorn, oil and salt during exposure to microwave radiation to effect the popping of the popcorn, said container being microwave transparent and having popcorn, oil and salt therein and being sealed whereby vapor produced during heating expands the internal volume of the container to allow room for popping of the popcorn, said container having one wall adapted to rest on the floor of the oven and be disposed between the popcorn and floor of a microwave oven, wherein the improvement comprises:

said container also including a layer of thermal insulating material associated with the wall in a manner such that the material will be disposed between the popcorn and oven floor during exposure of the container and popcorn to microwave radiation, said material having a thermal conductivity of less than about 0.001 calories/cm$^2$ °C./cm, a density of less than about 0.4 gm/cm$^3$ and a thickness of less than about $\frac{3}{8}''$ sufficient to prevent the loss of at least about 18 calories per gram of popcorn in the container during popping.

2. A container as set forth in claim 1 wherein the thermal insulating properties of the material are such as to prevent the loss of at least about 21 calories per gram of popcorn during popping of the popcorn.

3. A container as set forth in claim 2 wherein the material has sufficient thermal insulating properties to prevent the loss of at least about 24 calories per gram of popcorn in the container.

4. A container as set forth in claim 3 wherein the material has thermal insulating properties sufficient to prevent the loss of at least about 27 calories per gram of popcorn contained in the container during popping.

5. A container as set forth in claim 1, 2, 3, or 4 wherein the thermal conductivity of the material is less than about 0.0005 calories/cm$^2$ °C./cm, a density of less than about 0.2 gm/cm$^3$ and a thickness of less than about $\frac{1}{4}''$.

6. A container as set forth in claim 5 wherein the thermal conductivity of the material is less than about 0.00025 a density of less than about 0.1 gm/cm$^3$ and a thickness of less than about $\frac{1}{8}''$.

7. A container as set forth in claim 6 wherein the material is secured to an exterior surface of the wall.

8. A container as set forth in claim 7 including indicia on an exposed surface of the material.

9. A container as set forth in claim 1 wherein said material includes corrugated paper.

* * * * *